(12) United States Patent
Acharya

(10) Patent No.: US 7,010,591 B1
(45) Date of Patent: Mar. 7, 2006

(54) SELF-CONFIGURING TRUNKING ON A NETWORK DEVICE

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 773 days.

(21) Appl. No.: 09/768,293

(22) Filed: Jan. 25, 2001

(51) Int. Cl.
*G06F 15/173* (2006.01)
(52) U.S. Cl. .................................. 709/224; 709/238
(58) Field of Classification Search ............... 709/238, 709/249, 239, 227, 228, 224, 223, 250; 370/229, 370/351, 352, 401, 389, 431
See application file for complete search history.

(56) References Cited

U.S. PATENT DOCUMENTS

| | | | | |
|---|---|---|---|---|
| 5,949,788 A * | 9/1999 | Friedman et al. | ............ | 370/431 |
| 6,049,528 A * | 4/2000 | Hendel et al. | ............... | 370/235 |
| 6,104,696 A * | 8/2000 | Kadambi et al. | ........... | 370/218 |
| 6,112,251 A * | 8/2000 | Rijhsinghani | ................ | 709/249 |
| 6,275,861 B1 * | 8/2001 | Chaudri et al. | .............. | 709/238 |
| 6,445,715 B1 * | 9/2002 | Annaamalai et al. | ........ | 370/466 |
| 6,463,479 B1 * | 10/2002 | Jennings et al. | ............ | 709/250 |
| 6,535,489 B1 * | 3/2003 | Merchant et al. | ........... | 370/244 |
| 6,580,715 B1 * | 6/2003 | Bare | .......................... | 370/396 |
| 6,591,303 B1 * | 7/2003 | Hendel et al. | .............. | 709/238 |
| 6,721,322 B1 * | 4/2004 | Lakhani et al. | ............. | 370/352 |
| 6,765,866 B1 * | 7/2004 | Wyatt | .......................... | 370/229 |
| 6,788,682 B1 * | 9/2004 | Kimmitt | ..................... | 370/389 |
| 6,819,654 B1 * | 11/2004 | Soloway et al. | ............ | 370/238 |
| 2003/0198222 A1 * | 10/2003 | Wils et al. | ................... | 370/389 |
| 2004/0037278 A1 * | 2/2004 | Wong et al. | ................ | 370/389 |

* cited by examiner

*Primary Examiner*—Abdullahi E. Salad
(74) *Attorney, Agent, or Firm*—Harrity Snyder LLP

(57) ABSTRACT

A system automatically establishes a trunk between first and second network devices. The system monitors a source address and destination addresses in packets destined to or received from the second network device and determines whether a communication pattern exists. When a communication pattern is determined to exist, the system automatically establishes the trunk between the first network device and second network device.

14 Claims, 4 Drawing Sheets

SELF-CONFIGURING TRUNKING ON A NETWORK DEVICE

TECHNICAL FIELD

The present invention relates generally to communication systems and, more particularly, to systems and methods for improving bandwidth at a network device.

BACKGROUND ART

Trunking is a technique that treats two or more point-to-point connections between the same two network devices as a single network link. Trunking is used to obtain a higher bandwidth path between two network devices, such as two switches or a server and a switch. Trunking also increases reliability by maintaining redundant connections between the network devices.

Currently, in order to set up trunks between network devices, a network administrator must manually establish the trunks by configuring the network device via software. In addition to the inherent delays that are present in any manual activity, such an approach is also prone to errors (e.g., the network administrator may associate the incorrect ports of the network devices with the trunk).

DISCLOSURE OF THE INVENTION

There exists a need for a mechanism that automatically establishes trunks between network devices. This and other needs are met by the present invention, where local hardware, under software control when needed, automatically establishes trunks between network devices in response to detecting predetermined communication patterns.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that includes a receiver and an internal rules checker. The receiver receives packets having a source address and a destination address. The internal rules checker monitors the received source and destination addresses in the received packets, determines whether a communication pattern exists over a predetermined period of time, and establishes one or more trunks between the network device and at least one other network device in response to determining that a communication pattern exists.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
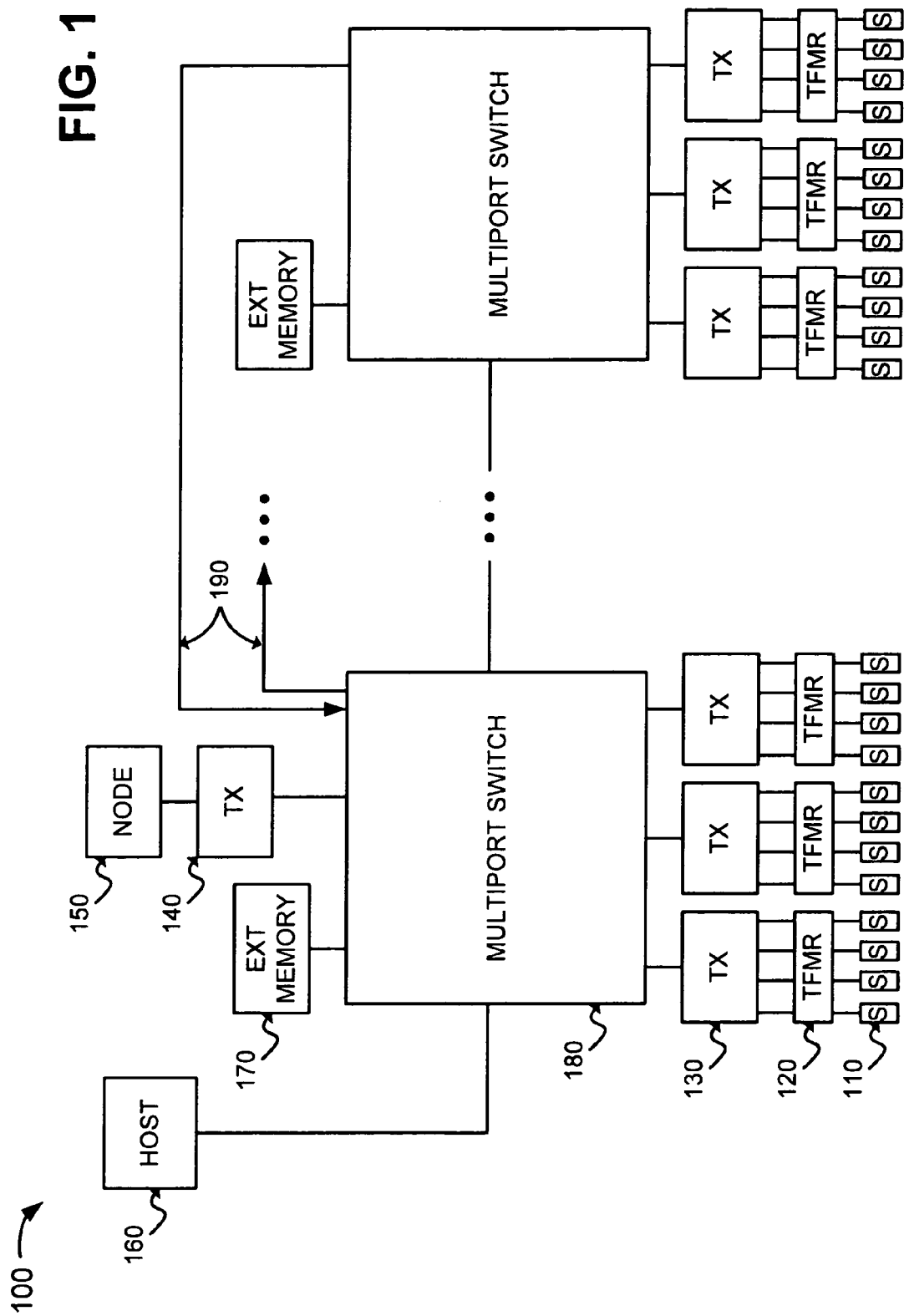
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
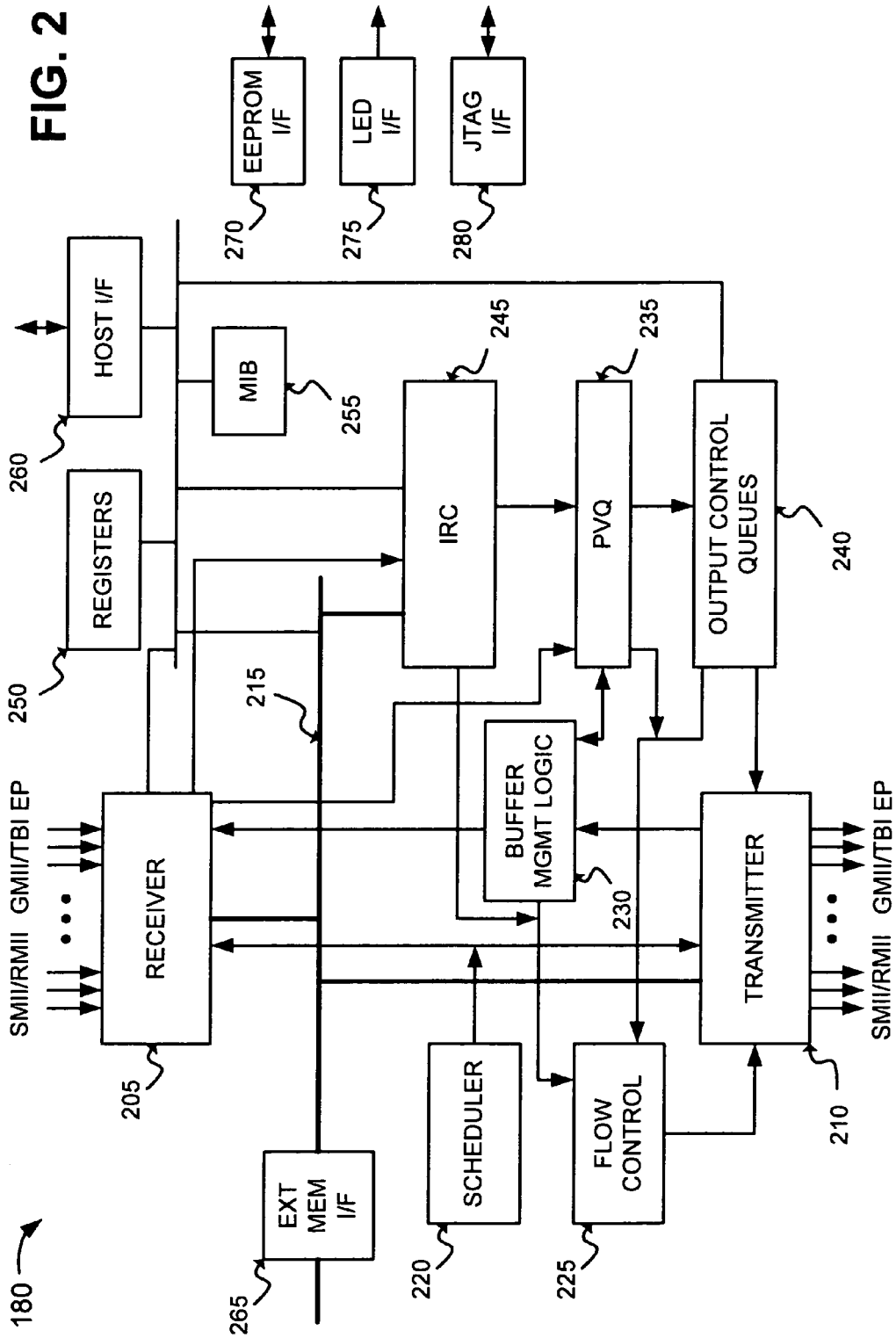
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Implementation

The present invention is directed to improving bandwidth between a multiport switch, such as the multiport switch 180 described above, and another network device. The multiport switch 180 identifies communication patterns and automatically establishes trunks to increase bandwidth between the multiport switch 180 and the network device.

Figure 3:
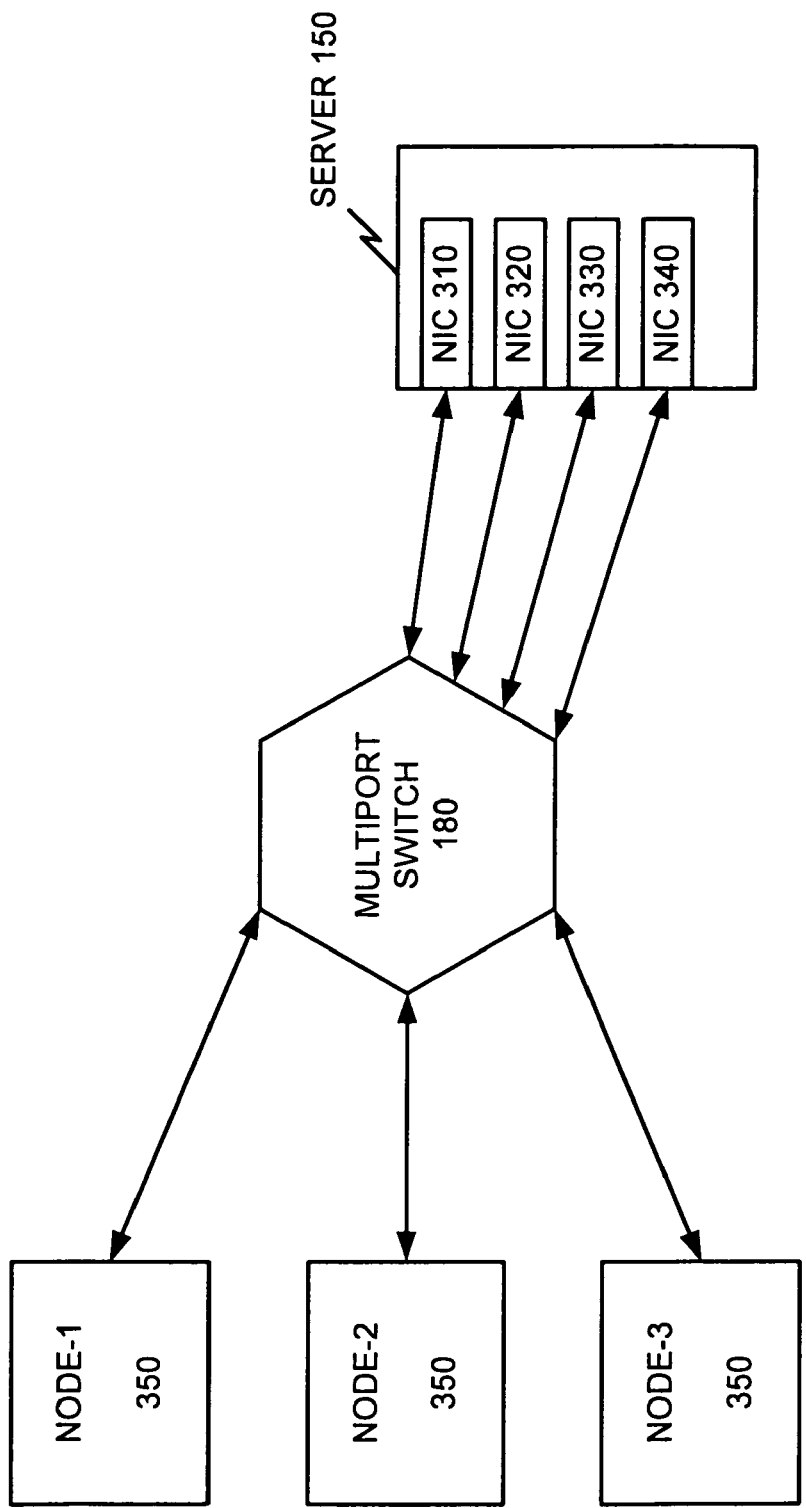
FIG. 3 is a simplified representation of the system of FIG. 1.

FIG. 3 is a simplified representation of the system 100 of FIG. 1. In FIG. 3, the node 150 of FIG. 1 is represented as a server. It will be appreciated that the node 150 may, as described above, alternatively include other types of network devices, such as a gateway to a high-speed backbone network. As illustrated, the server 150 may include a group of network interface cards (NICs) 310–340, each being separately connected to the multiport switch 180, through which packets are transmitted. The multiport switch 180 may also be connected to a group of nodes 350. These nodes 350 may be configured similarly to node 150 or may include one or more network stations 110.

Exemplary Processing

Figure 4:
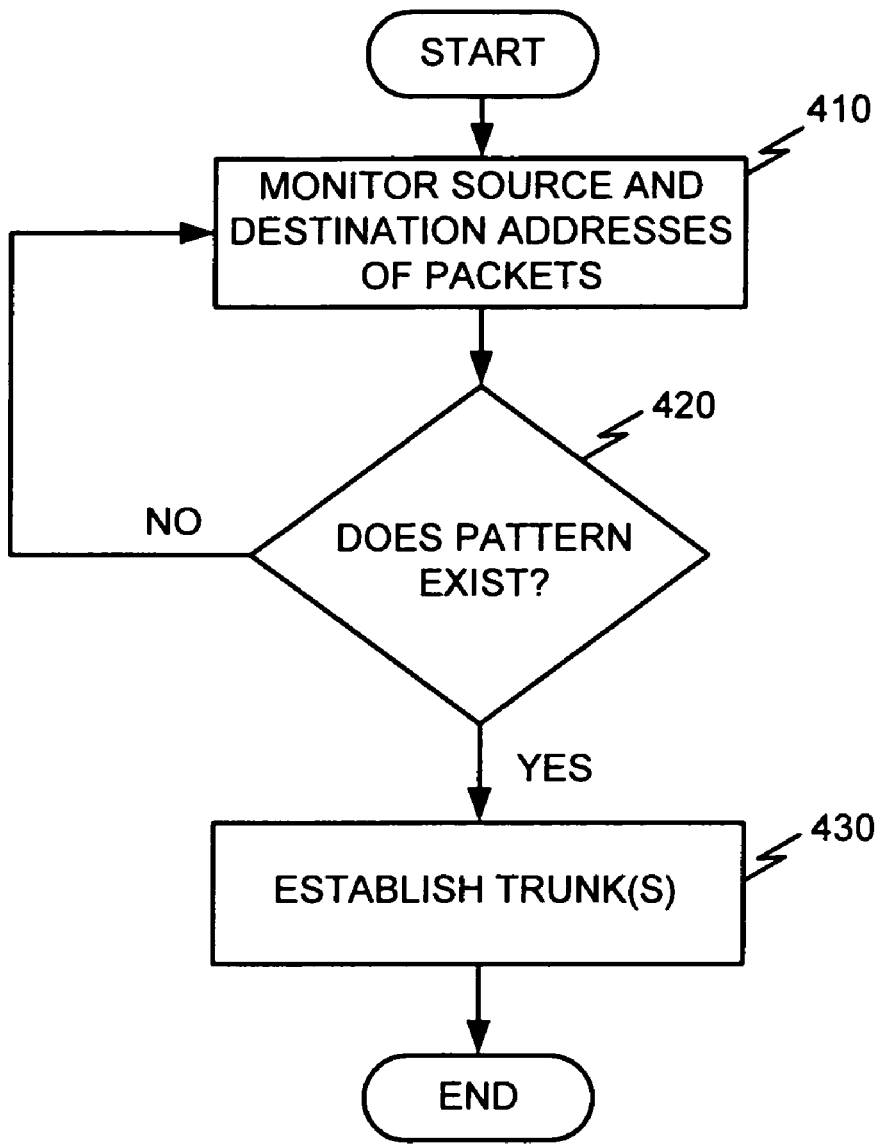
FIG. 4 is a flowchart of exemplary processing for configuring trunking according to an implementation consistent with the present invention.

FIG. 4 is a flowchart of exemplary processing for configuring trunking according to an implementation consistent with the present invention. Processing may begin with a network device, such as multiport switch 180, monitoring source and destination addresses of packets passing through the switch 180 (step 410). This monitoring may be performed, for example, by the IRC 245. The multiport switch 180 monitors the source and destination addresses to identify common communication patterns, such as a predetermined number of packets being sent from a first network device to a second network device over a certain period of time (step 420).

Assume, for example, that the multiport switch 180 determines that all of the packets coming from the server 150 are going to node-1 and node-2 350. In response to detecting this communication pattern, the multiport switch 180 may establish one or more trunks between the switch 180 and the server 150 (step 430). To assign ports to a trunk, the multiport switch 180 may set one or more control bits in a register. In an implementation consistent with the present invention, the multiport switch 180 may set a TRUNK bit and a TRUNK_ACT bit in, for example, a Port IRC Control Register. This register may be included, for example, in registers 250 (FIG. 1).

The TRUNK bit may indicate whether a corresponding port of the multiport switch 180 is a member of a trunk. The TRUNK_ACT bit may indicate whether a corresponding port is an active member of a trunk. If this bit is set to "1," for example, the IRC 245 may consider this port as a possible output port. If this bit is set to "0," on the other hand, and the TRUNK bit is set, the IRC 245 will not forward frames to this port. In such a situation, the IRC 245 may choose another port that is active (i.e., a port whose TRUNK bit and TRUNK_ACT bit are set to "1").

Table 1 summarizes the functions of the trunk control bits. As illustrated, if the TRUNK bit is set to a "0," the corresponding port is not part of a trunk. As such, the multiport switch 180 may not forward frames directed to this port to another port. If the TRUNK bit is set to a "1" and the TRUNK_ACT bit is set to a "0," the corresponding port is part of a trunk, but is currently inactive. This may be due, for example, to a link failing. In such a situation, the multiport switch 180 may redirect frames destined for this port to another port in the trunk. If the TRUNK bit is set to "1" and the TRUNK_ACT bit is set to "1," the corresponding port is an active part of the trunk. As a result, the multiport switch 180 may transmit frames from this port.

TABLE 1

| TRUNK bit | TRUNK_ACT bit | Description |
| --- | --- | --- |
| 0 | X | Port is not a part of a trunk. |
| 1 | 0 | Port is part of a trunk, but is inactive. |
| 1 | 1 | Port is an active part of a trunk. |

Returning to the configuration illustrated in FIG. 3, the multiport switch 180 may, for example, aggregate the flows from the server 150 such that the connections to NIC 310 and NIC 320 are considered one trunk and the connections to NIC 330 and NIC 340 are considered a separate trunk. Other trunking configurations may alternatively be used. By trunking the connections between the server 150 and the multiport switch 180, higher bandwidth paths are obtained. Moreover, trunking increases reliability by allowing an alternative port to be used in the event that one of the ports of a particular trunk fails. If, at a later time, communication patterns from the server 150 change, the multiport switch 180 may either reassign the ports to new trunks or disable trunking all together.

Described has been a system and method for automatically establishing one or more trunks at a multiport switch. Advantages of the present invention include the ability to quickly and accurately establish trunks when needed.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while the above description focussed on establishing a trunk between a multiport switch and a server, the present invention is not so limited. In alternative implementations consistent with the present invention, trunks may be established between other network devices, such as between a multiport switch and a network station.

What is claimed is:

1. A method for establishing a trunk between first and second network devices, comprising:

monitoring, via the first network device, at least one of a source address or destination address in packets destined for or received from the second network device;

determining, based on the monitoring, whether a communication pattern exists, where the determining includes detecting a predetermined number of packets having identical source or destination addresses over a predetermined period of time; and automatically establishing the trunk between the first network device and second network device when the communication pattern is determined to exist.

2. The method of claim 1 wherein the first network device includes a multiport switch and the second network device includes a server.

3. The method of claim 1 wherein automatically establishing the trunk includes:

automatically establishing two or more trunks between the first network device and second network device.

4. The method of claim 1 wherein automatically establishing the trunk includes:

assigning at least two ports on the first network device to the trunk.

5. The method of claim 4 further comprising:

deactivating the trunk when the communication pattern is determined to no longer exist and reassigning the ports to new trunks if a new pattern is determined.

6. A system for establishing at least one trunk between a first network device and a second network device, comprising means for monitoring at least one of traffic to the second network device or traffic from the second network device;

means for determining, based on the monitoring, if a communication pattern exists, where the means for determining includes:

means for detecting a predetermined number of packets having identical source or destination addresses over a predetermined period of time; and means for automatically establishing the at least one trunk between the first network device and the second network device when a communication pattern is determined to exist.

7. The system of claim 6 wherein the first network device includes a multiport switch and the second network device includes a server.

8. The system of claim 6 wherein the means for automatically establishing the at least one trunk comprises:

means for associating two or more ports of the first network device with each of the at least one trunk.

9. The system of claim 8 wherein the means for automatically establishing the at least one trunk further comprises:

associating one or more trunk control bits with each port, the trunk control bits indicating a status of the port.

10. The system of claim 6 further comprising:

means for deactivating the at least one trunk when the communication pattern is determined to no longer exist.

11. A network device comprising:

a receiver configured to receive packets having a source address and a destination address; and an internal rules checker configured to Monitor the received source and destination addresses in the received packets, determine whether a communication pattern exists over a predetermined period of time by detecting whether a predetermined number of packets having identical source or destination addresses over the predetermined period of time, and establish one or more trunks between the network device and at least one other network device in response to determining that a communication pattern exists.

12. The network device of claim 11 wherein the internal rules checker is further configured to:
deactivate the one or more trunks when the communication pattern is determined to no longer exist.

13. The network device of claim 11 wherein, when establishing the one or more trunks, the internal rules checker is configured to:
assign at least two ports on the network device to each trunk.

14. The network device of claim 11 further comprising:
at least one register configured to store trunking information,
wherein, when establishing the one or more trunks, the internal rules checker sets at least one bit in the at least one register based on the determined communication pattern.

* * * * *